C. TRUITT.
ELECTRIC OVEN.
APPLICATION FILED JULY 11, 1914.

1,218,341.

Patented Mar. 6, 1917.

Witnesses:
Paul M. Hunt
J. W. Michael, Jr.

Inventor
Clarence Truitt
By Edson Bros.
Attorneys

UNITED STATES PATENT OFFICE.

CLARENCE TRUITT, OF POMONA, CALIFORNIA.

ELECTRIC OVEN.

1,218,341.　　Specification of Letters Patent.　　Patented Mar. 6, 1917.

Application filed July 11, 1914.　Serial No. 850,501.

*To all whom it may concern:*

Be it known that I, CLARENCE TRUITT, a citizen of the United States, residing at Pomona, in the county of Los Angeles and State of California, have invented certain new and useful Improvements in Electric Ovens; and I do hereby declare the following to be a full, clear, and exact description of the invention, such as will enable others skilled in the art to which it appertains to make and use the same.

This invention relates to improvements in electric heaters, one object of which is the provision of a device of this character particularly adapted to be used as an electrically heated oven, in which the circulation of the heated air or other medium is increased and made positive by auxiliary means, thereby increasing the efficiency of the oven, equalizing the temperature therein, and rendering the transference of the electric energy into caloric energy more rapid.

Another object of the invention is the production of a device of this character which shall be simple and efficient in construction whereby the heated air or other medium shall be confined within the walls of the oven, the loss by conduction being practically eliminated.

With these and other objects in view, which will become apparent from the following description, this invention comprises an electrically heated oven formed with walls composed of non-heat conducting material, provided with a duct through which heated air or other medium is adapted to pass, said duct having positioned therein means controlled exteriorly of said oven for increasing the circulation within the oven, said oven being further provided with a heating element, also controlled exteriorly thereof, over which the air or other medium is passed prior to its entering the oven proper.

In the accompanying drawings is illustrated the preferred embodiment of my invention, wherein it will be understood that various changes and modifications may be made as to the detailed construction and arrangement of parts without departing from the spirit of the invention, and in which drawings.

Figure 1:
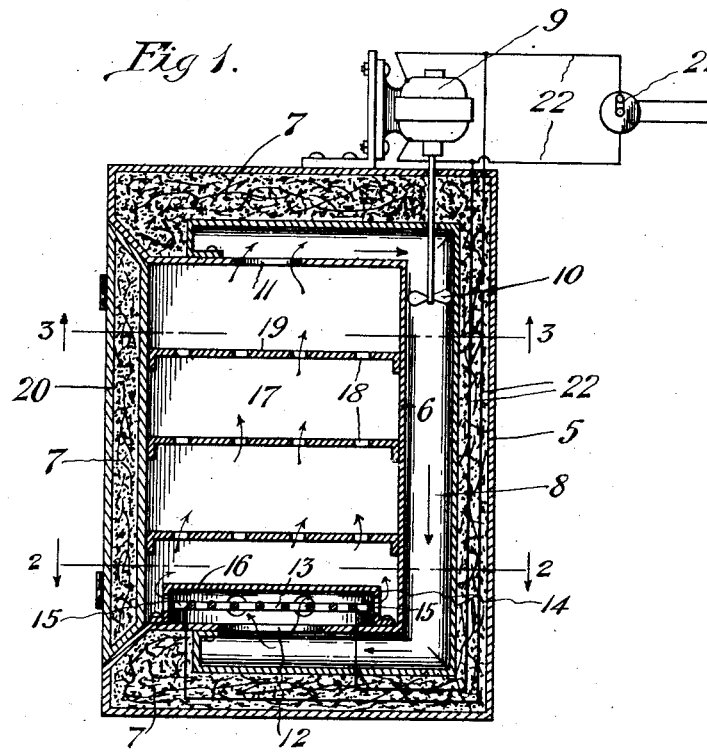
Figure 1 is a vertical sectional view through the oven.
Figure 2:
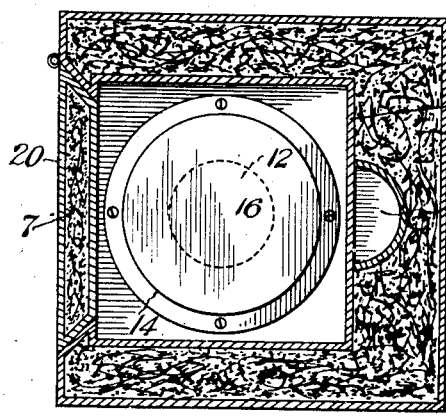
Fig. 2 is a horizontal section taken on line 2—2 of Fig. 1.
Figure 3:
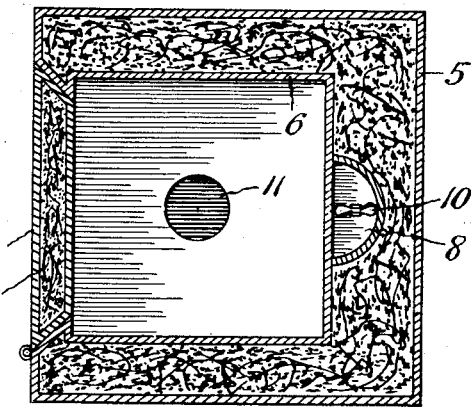
Fig. 3 is a horizontal section taken on line 3—3 of Fig. 1.

In the embodiment of the invention as disclosed in the accompanying drawing, like characters of reference designate corresponding parts of the several figures. 5 represents the outer wall of the oven, which may be made of any suitable material such as metal, and 6 designates the inner wall thereof likewise made of any suitable material. Interposed between the outer and inner walls of said oven is positioned non-heat conducting material 7 adapted to form an insulation between said outer and inner walls thereby preventing the loss of heat through conduction, and greatly increasing the caloric energy within said oven. Positioned also between the inner and outer walls of said oven is an air duct 8, said air duct being preferably embedded within the non-heat conducting material 7. The air duct 8 has its inlet 11 in the upper inner wall of the oven 17 and its outlet 12 in the lower inner wall of the oven proper 17. Mounted exteriorly of the oven is a motor 9, the shaft of which extends through said heat insulating wall 7 into the air duct 8, the end of said shaft protruding into said air duct 8 and having mounted thereon a suitable draft inducing element shown in the drawing as a fan 10.

Positioned directly over said outlet port 12 of the air duct 8 may be positioned an electrical heating element 13, composed of any suitable material, the coefficient of resistance of which, is comparatively high. The heating element 13 positioned on the lower inner wall of the oven is preferably housed within a casing 14, said casing 14 being adapted to cover the heating element 13 and to be supported by engagement with the lower inner wall of said oven, said casing 14 having formed in its side walls apertures 15 permitting of the heated air or other medium after deflection by the upper wall 16 of the casing 14, passing out through the apertures 15 in the side walls of the casing 14, thence upwardly through the oven proper 17.

The passage of the heated air or other medium through the electrically heated oven, is indicated by arrows in Fig. 1, from which figure it will be noted that when the armature of the motor 9 is rotated, the fan 10 within the duct 8 will induce a current of air downwardly through the duct 8 thence through the outlet 12 of said duct 8, over the heating element 13, whereupon said heated air or other medium is deflected by the upper wall 16 of the housing 14, thence well distributed throughout the oven by passing through the apertures 15 of said housing 14. After the heated air or other medium has been introduced into the oven proper, designated in the drawing as 17, the same rises comparatively rapidly owing to the influence of the fan 10 rotated within the duct 8, through the apertures 18 formed in the shelves 19 positioned within the oven proper 17, thence through the inlet 11 in the upper inner wall of said oven to the fan 10, at which time the speed of the heated air or other medium is again accelerated, forcing the same downwardly and upwardly over the heating element and into said oven.

Access to the oven proper 17 may be had through the door 20, the walls of said door being formed of metal or other suitable material having non-heat conducting material interposed therebetween. The door 20 is formed so as to make a substantially air tight joint with the walls of said oven when the same is closed, thereby preventing the escape of the heated air or other medium during the period said door is closed.

The motor 9 and the heating element 13 are both controlled exteriorly of the oven by means of a switch 21, said switch being connected to the motor 9 and the heating element 13 by electric conductors 22. Inasmuch as the switch 21 controls both the motor and the heating element, it is obvious that both the motor and heating element operate simultaneously within the oven, thereby producing a circulation of heated air or other medium as above indicated.

The air duct 8 as constructed and as best illustrated in Fig. 1 of the drawing is, as previously stated, preferably embedded in the non-heat conducting material 7 interposed between the inner wall 6 of the oven and the outer wall 5 of said oven. Although the heated air or other medium after passing upward through the oven proper 17 is conducted into the air duct 8 for purposes of increasing its momentum and efficiency, practically no loss of heat is experienced because of the fact that the inner wall of the oven also forms one of the walls of the air duct, and since this wall is preferably constructed of metal of high conductivity, any heat which may be present in the duct 8 is rapidly conducted into the oven 17. It will be noted that the construction as above described is very efficient in the utilization and generation of caloric energy.

It is obvious that this invention is not limited to the precise construction shown in the drawings, and that various modifications and alterations may be made therein by one skilled in the art, within the scope of the appended claims.

Having thus described my invention, what I claim as new and desire to secure by Letters Patent is:

1. The combination with an electrically heated oven, of an air duct disposed between the walls thereof, and substantially surrounded by a non-heat conductor, said duct being continuous and communicating with the upper and lower portions of the oven, a heating element disposed over an opening of said duct to retard the circulation, and means to produce a cyclic change of air or other medium within said oven, through said duct, and force the air into contact with said element to reheat the air.

2. The combination with an electrically heated oven, of a continuous air duct disposed within the walls thereof and communicating only with the two extremes of heat zones of said oven, a heating element in one of said zones and housed within a cover, said cover having an imperforate top and provided with foraminous side walls to produce an equal distribution of heated air or other medium within the oven, and means to assist the natural flow of the air through the oven, the duct, and into contact with said heating element.

3. In an electrically heated oven the combination of a substantially continuous air duct disposed within the walls thereof and communicating with the extreme heat zones of the oven, a heating element in one of said zones and arranged at one end of the air duct, means associated with the heating element to retard the circulation over and through the heater and to distribute the heated air to one of the heat zones, and means to increase the circulation through the duct to the heater by exhausting air from the other heat zone.

4. In an electrically heated oven, the combination of a substantially continuous air duct disposed within the walls thereof and communicating with the extreme heat zones of the oven, a heating element in one of said zones and arranged at one end of the air duct, a foraminous cover for said heating element, and means to produce a lower air pressure in the lower heat zone and an increase of pressure in the higher heat zone adjacent to and within the cover inclosing the heating element.

In testimony whereof I affix my signature in presence of two witnesses.

CLARENCE TRUITT.

Witnesses:
L. E. SHEETS,
J. G. SHEETS.